Oct. 22, 1957 K. A. BROWNE ET AL 2,810,610
ELECTRIC CONTROL FOR PNEUMATIC TRAIN BRAKES
Filed Dec. 29, 1950 6 Sheets-Sheet 1

INVENTORS
KENNETH A. BROWNE
BY JAMES FREDERICK NORTON
Hudson Boughton,
Williams, David & Hoffmann
ATTORNEYS Fig. 3
Fig. 11
Fig. 12

INVENTORS
KENNETH A. BROWNE
BY JAMES FREDERICK NORTON
ATTORNEYS

Oct. 22, 1957 K. A. BROWNE ET AL 2,810,610
ELECTRIC CONTROL FOR PNEUMATIC TRAIN BRAKES
Filed Dec. 29, 1950 6 Sheets-Sheet 3

INVENTORS
KENNETH A. BROWNE
BY JAMES FREDERICK NORTON
Hudson, Boughton,
Williams, David & Hoffmann
ATTORNEYS

INVENTORS
KENNETH A. BROWNE
BY JAMES FREDERICK NORTON
Hudson Boughton,
Williams, David & Hoffmann
ATTORNEYS United States Patent Office 2,810,610
Patented Oct. 22, 1957

2,810,610

ELECTRIC CONTROL FOR PNEUMATIC TRAIN BRAKES

Kenneth A. Browne, Lakewood, and James Frederick Norton, Cleveland Heights, Ohio, assignors to The Chesapeake and Ohio Railway Company, Cleveland, Ohio, a corporation of Virginia Application December 29, 1950, Serial No. 203,499

10 Claims. (Cl. 303—15)

This invention relates to the control of pneumatic train brakes and provides improved air brake control apparatus adapted to be incorporated in new equipment, or applied to existing equipment, and which will produce more efficient, reliable and satisfactory braking than has been obtainable heretofore.

The improved air brake control apparatus of this invention will be described in detail hereinafter but, in general, it accomplishes an important purpose in that it provides for the application and release of the brakes of all of the cars of the train substantially simultaneously such as has not been consistently obtainable heretofore. It is important also that this function is carried out without interfering with the conventional service and emergency functioning of the pneumatic train brake system in response to brake pipe pressure reductions produced in the customary way.

As its principal object, this invention provides improved air brake control apparatus in which novel electrical means accomplishes the above mentioned important function, namely that of producing a substantially simultaneous application or release of all of the brakes of the train and is adapted to accomplish this function without interfering with the conventional pneumatic control of the brakes.

Another object is to provide improved air brake control apparatus of this character in which the electrical means requires only a single train wire and in which the portion of the apparatus required to be located on the cars can be in the form of an adapter unit adapted to be readily applied to the control valve mechanisms of existing pneumatic brake systems and particularly to control valve mechanisms of the so-called "AB" type.

A further object of this invention is to provide an adapter device for an AB control valve mechanism in which pressure fluid differential responsive valve means controlling the supply of locomotive fluid to the brake cylinder is dependent upon a normally open restricted bleed passage and upon the functioning of a valve means which varies the restriction of the bleed passage.

Yet another object is to provide improved control valve mechanism of this character in which electromagnetic valve means controls the restriction of the bleed passage and in which the electromagnets of the electromagnetic valve means of the various cars are connected in series relation by the train wire.

As an additional object, this invention provides air brake apparatus of the character referred to in which the application of the brakes of the cars can be graduated on or off by varying the ampere value of the energizing current for the electromagnets of the electromagnetic valve means of the cars, and in which novel current control means is provided on the locomotive for this purpose.

Other objects and advantages of this invention will be apparent in the accompanying drawings and in the following detailed description.

In the accompanying sheets of drawings.

The improved air brake apparatus of this invention comprises, in general, a valve and switch unit 10 located on each of the load vehicles or cars 11 of a train (see Figs. 1 and 18) and connected with a control vehicle or locomotive 12 by means of a conventional brake pipe 13 and by a train wire 14. The apparatus also includes a current control device 24 located on the locomotive 12, or in some cases at a stationary yard control station (not shown), and a valve and switch unit 16 located on a rear end control vehicle or caboose 17. The valve and switch units 10 and 16 are operably connected in circuit with the current control device 24 by the train wire 14 and by a common ground conductor provided by the car couplers and the track and which is here represented by the rail 18.

*The valve and switch unit*

Figure 1:
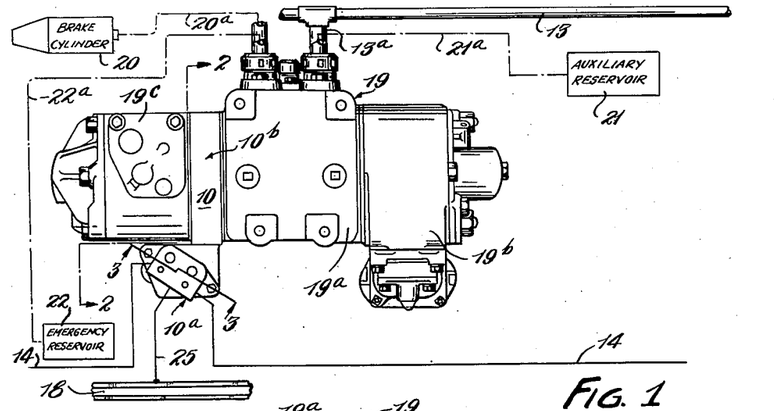
Figure 1 is a top plan view somewhat diagrammatic in form and showing air brake apparatus embodying the present invention and in which a valve and switch unit in the form of an adapter is applied to a control valve mechanism of the AB type.
Figure 2:
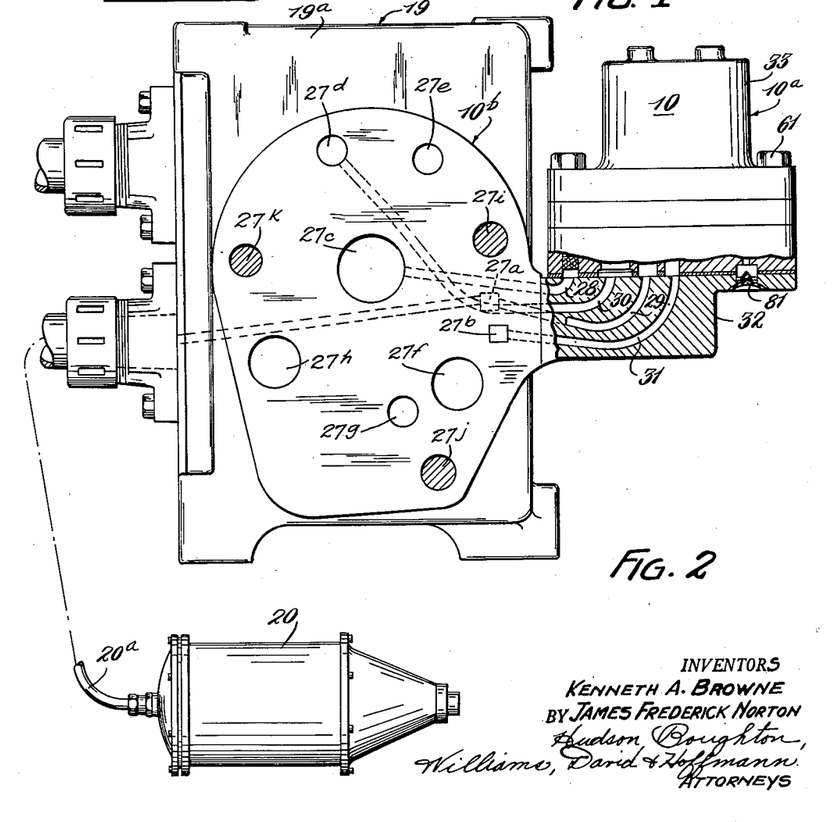
Fig. 2 is a transverse section taken through the control valve mechanism of Fig. 1, the view being taken substantially on section line 2—2 of Fig. 1 and showing the adapter unit with portions thereof broken away.
Figures 3, 11, 12:
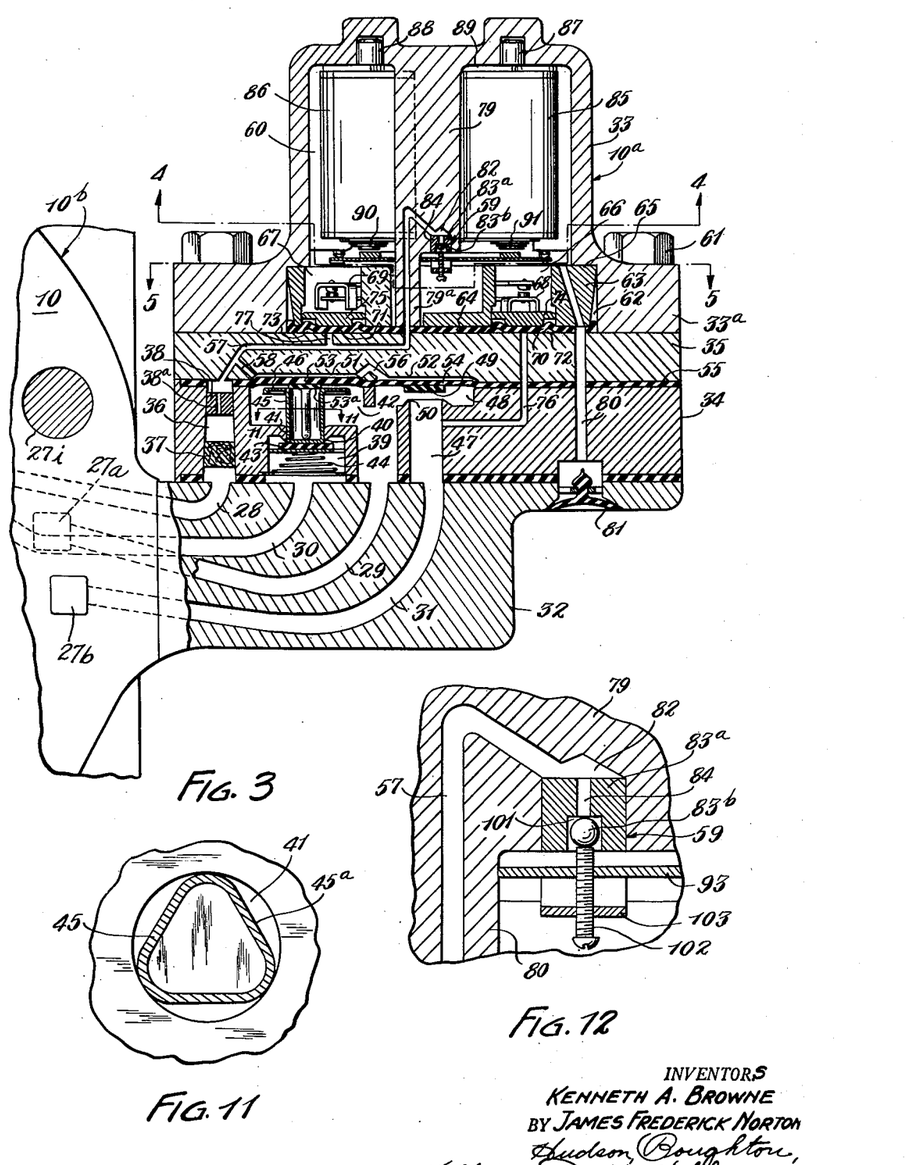
Fig. 3 is a larger scale vertical section taken through the adapter unit approximately as indicated by the irregular section line 3—3 of Fig. 1.
Fig. 11 is a transverse sectional detail taken through a portion of the adapter unit as indicated by section line 11—11 of Fig. 3.
Fig. 12 is a fragmentary vertical section corresponding with a portion of the view of Fig. 3 and showing the bleed valve thereof on a larger scale.
Figure 4:
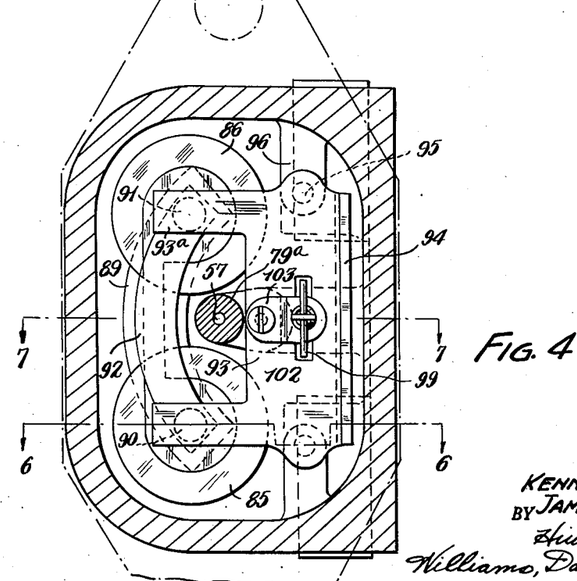
Fig. 4 is a transverse section taken through the adapter unit substantially as indicated by section line 4—4 of Figs. 3, 6 and 7.
Figure 5:
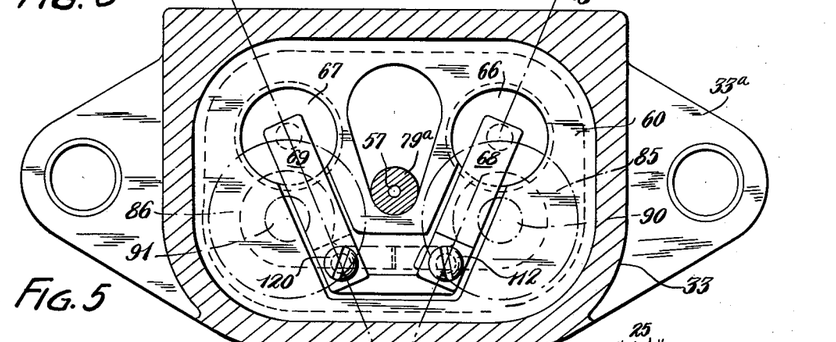
Fig. 5 is another transverse section taken through the adapter unit substantially as indicated by section line 5—5 of Figs. 3 and 8.
Figure 6:
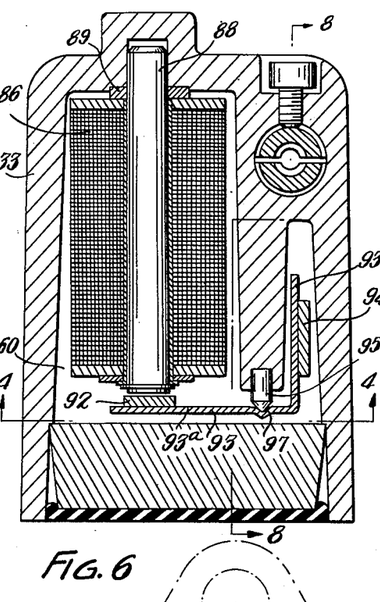
Figs. 6 and 7 are partial vertical sections taken through the adapter unit substantially as indicated by section lines 6—6 and 7—7, respectively, of Fig. 4.

As shown in Figs. 1, 2 and 3, the valve and switch unit 10 can be in the form of an adapter unit adapted to be applied to the control valve mechanisms 19 of the cars 11. This valve and switch unit 10 comprises a housing portion 10a in which certain valve devices and electric switches are contained, as explained hereinafter, and a substantially flat plate portion 10b.

The control valve mechanisms 19 of the cars 11 are here shown as being of the AB type and, as is understood by those skilled in the air brake art, each of these mechanisms comprises an intermediate mounting bracket portion 19a and a pair of service and emergency end portions 19b and 19c connected with such intermediate bracket portion. It is likewise understood by those skilled in the air brake art that the service end portion 19b embodies what is known as a triple valve mechanism. The unit 10 is applied to the control valve mechanism 19 by having the plate portion 10b sandwiched between the mounting bracket portion 19a and the emergency portion 19c. The control valve mechanism 19 is shown as being connected with the brake pipe 13, a conventional brake cylinder 20, a conventional auxiliary reservoir 21 and a conventional emergency reservoir 22, by suitable pipe connections 13a, 20a, 21a, and 22a. In addition to the purpose regularly served by the emergency reservoir 22 in conjunction with the AB control valve mechanism 19, this reservoir also serves as a supply reservoir for supplying pressure fluid to the brake cylinder 20 under the control of the unit 10.

Figure 18:
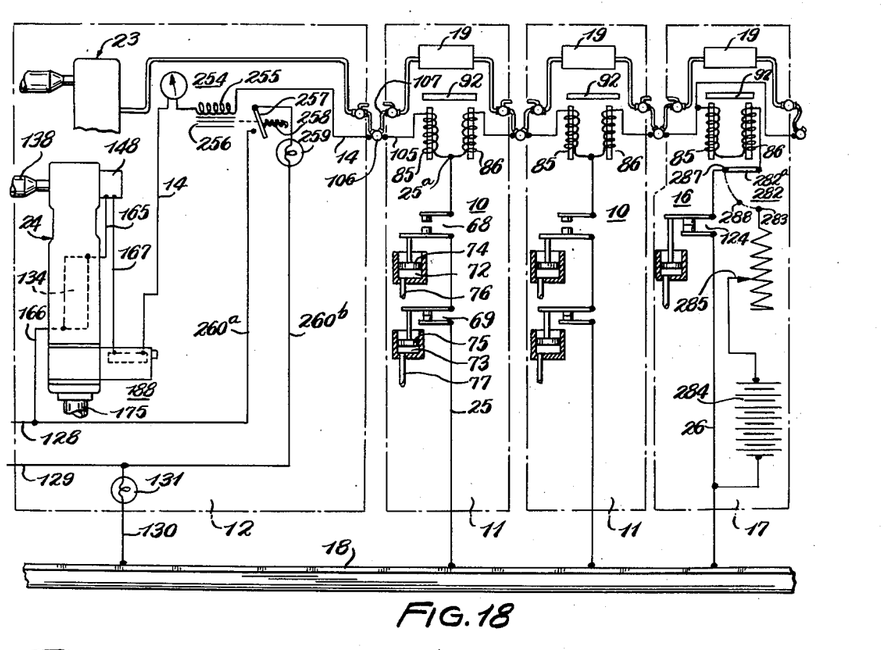
Fig. 18 is a wiring diagram further illustrating the improved air brake apparatus of this invention.

As shown in Figs. 1 and 18, the circuit connections for the valve and switch unit 10 also include a ground connection 25 on each of the cars 11 and which is here represented by a conductor extending from the housing portion 10a to the rail 18. The valve and switch unit 16 of the caboose 17 is provided with a similar ground connection designated 26. The control apparatus of the locomotive includes a conventional engineer's brake valve 23 with which the AB control valve mechanisms 19 are connected by the brake pipe 13, and the above-mentioned current control device 24 with which the valve and switch units 10 and 16 are connected by the train wire 14.

The plate portion 10b of the adapter unit 10 is provided with a number of openings which register with various openings of the mounting bracket portion 19a and the emergency portion 19c of the control valve mechanism 19. The housing portion 10a of the unit 10 is provided with a plurality of passages which extend into the plate portion 10b and communicate with certain of the openings of the latter for connecting the unit in operative relation with the control valve mechanism 19. These passages of the housing portion 10a comprise a brake pipe passage 28, a first brake cylinder passage 29, an emergency reservoir passage 30 and a second brake cylinder passage 31.

The brake pipe passage 28 receives brake pipe pressure from the control valve mechanism 19. The first brake cylinder passage 29 is connected with the brake cylinder 20 through the mounting bracket portion 19a. The emergency reservoir passage 30 is adapted to be connected with the emergency reservoir 21. The second brake cylinder passage 31 is connected with a suitable portion of the control valve mechanism, such as the inshot and timing valves thereof, and is either a pressure fluid passage or an exhaust passage depending upon the operation of the control valve mechanism. By way of example, U. S. Patent 2,031,213 granted February 18, 1936 shows a conventional control valve mechanism of the kind above referred to and to which the present invention is applicable. The openings of the plate portion 10b comprise a pair of recess openings or ports 27a and 27b in opposite faces of such plate portion and a number of through openings 27c, 27d, 27e, 27f, 27g, and 27h. The openings 27i, 27j and 27k are also through openings but these merely accommodate the connecting studs which connect the sections 19c and 10b with the bracket 19a.

The port 27a faces toward the bracket 19a and registers with the passage of the latter which is designated 178 in the above-mentioned AB brake patent. The port 27b faces toward the emergency section 19c and registers with the passage of the latter which is designated 178 in said patent. The through opening 27c registers with passage 91 of the AB brake patent which contains brake pipe pressure. The through opening 27d registers with passage 77 of the AB brake patent which is in communication with the emergency reservoir.

All of the through openings 27e, 27f, 27g and 27h are provided merely to maintain the continuity of those passages of the AB brake which extend into the emergency section 19c from the bracket section 19a. In the AB brake patent these continuous passages, with which the through openings 27e, 27f, 27g and 27h register respectively, are designated 51, 169, 193 and 113. The illustration in the AB brake patent, in which the passage 178 is shown as being of relatively small size, is diagrammatic. In the commercial embodiment of the AB brake, the passage 178 is of a relatively large size and the above-mentioned ports 27a and 27b communicate therewith, notwithstanding the offset relation in which these recess openings are shown in Fig. 2.

As best shown in Figs. 2 and 3, the housing portion 10a of the valve and switch unit 10 comprises a supporting arm 32 through which the above mentioned passages 28, 29, 30 and 31 extend, a magnet housing 33 and a pair of plate members 34 and 35 clamped between the arm 32 and the magnet housing 33. The plate member 34 has a strainer and orifice chamber 36 therein with which the brake pipe passage 28 communicates and which contains a suitable strainer or filter 37 and an orifice plug 38 located inwardly of the strainer and provided with a restricted orifice passage 38a. The plate member 34 is also provided with a valve chamber 39 with which the reservoir passage 30 communicates and in which is located a valve seat 40. The valve seat 40 is disposed around an opening 41 by which the valve chamber 39 is connected with a connecting passage or lower control chamber 42.

The operation of the valve and switch unit 10 is described in detail hereinafter but, by way of general explanation, it is pointed out that this unit can be designed to operate in response to any desired value of brake cylinder pressure. The unit 10, as herein disclosed, operates in response to a minimum brake cylinder pressure of 8 p. s. i. Whenever a brake pipe reduction of an 8 p. s. i. value or greater is made by the engineer for the purpose of making an electrically controlled application of the brakes, a brake cylinder pressure of 8 p. s. i. or greater should be developed in the brake cylinders of all cars of the train. Thus on all cars on which this minimum 8 p. s. i. brake cylinder pressure is actually developed, the units 10 of those cars will respond to such minimum brake cylinder pressure.

*The valves and control chambers of the valve and switch unit*

A valve 43 located in the valve chamber 39 of the valve and switch units 10 and 16 is normally held in seating engagement with the valve seat 40 by a compression spring 44 but is adapted to be moved away from this seat by the hollow stem portion 45 of a thrust member 46. The plate member 34 also has an opening 47 therein forming an upward continuation of the passage 31 and communicating with a valve chamber 48. This valve chamber is in open communication with the connecting passage 42. A valve 49 located in the chamber 48 is normally in an open position but is adapted to be moved to a closed position in engagement with an annular valve seat 50 surrounding the upper end of the opening 47.

The plate member 35 is provided with a pair of recesses forming upper control chambers 51 and 52 which are located above the valves 43 and 49, respectively. These control chambers are also formed, in part, by diaphragm members 53 and 54 defined by portions of a flexible sheet 55 clamped between the plate members 34 and 35. The diaphragm member 53 constitutes a fluid pressure differential responsive member for actuating the valve 43 and is movable in response to a pressure differential existing between the control chamber 51 and the connecting passage 42.

The diaphragm member 53 engages and overlies the upper end of the thrust member 46. The lower end of this thrust member is maintained in axial alignment with respect to the valve 43 by having the stem 45 slidable in the connecting opening 41. The cross-sectional shape of the stem 45 is of a non-circular form, as shown in Fig. 11, such that the flat portions 45a of the stem leave spaces in the opening 41 for the passage of fluid between the valve chamber 39 and the connecting passage 42. The upper end of the thrust member 46 is held in aligned relation with respect to the axis of the valve 43 as by means of a projection 53a on the underside of the diaphragm member 53 which engages in the upper end of the hollow stem 45.

The diaphragm member 54 constitutes a fluid pressure differential responsive member for actuating the valve 49. This diaphragm member is subject on the upper side thereof to the pressure of the control chamber 52 and on the underside thereof to the pressure of the brake cylinder passage 29. The control chamber 52 is connected with the control chamber 51 by a passage 56 formed in the plate member 35 and the control chamber 51 is, in turn, connected with a bleed passage 57 by a short passage 58. This bleed passage extends through the plate member 35 and through a portion of the magnet housing 33 to a normally open bleed valve 59. The bleed passage 57 is connected with a strainer chamber 36 and, hence, is in communication with the brake pipe passage 28 through the restricted orifice 38a of the orifice plug 38. As is further explained hereinafter, the bleed passage 57 is a vent passage which is normally open to atmosphere but is controlled, as to the venting of air therethrough, by the restricted orifice 38a and the normally open bleed valve 59. The control chambers 51 and 52 are therefore always supplied with brake pipe fluid but at a relatively restricted rate as permitted by the restricted orifice 38a.

The size relationship between the restricted orifice 38a and the orifice 84 of the normally open bleed valve 59 is explained hereinafter.

*The bleed valve actuating magnet of the valve and switch unit*

The magnet housing 33 is here shown as being a cup-shaped member having a chamber 60 therein and a flange 33a adapted to be held in connected relation with the plate members 34 and 35 and the arm 32 by the screws 61. The flanged lower end of the magnet housing 33 is provided with a recess 62 in which is disposed a block 63. A flexible sheet 64 is disposed between the block 63 and the upper face of the plate member 35. A shoulder 65 at the upper end of the recess 62 applies pressure to the block 63 causing the latter to clamp the sheet 64 against the plate member 35.

The block 63 is provided with a pair of laterally spaced openings forming switch chambers 66 and 67 in which are located a pair of electric switches 68 and 69 which will be further described hereinafter. The portions of the sheet 64 which extend across the lower ends of the switch chambers 66 and 67 form diaphragm members 70 and 71 which cooperate with the plate member 35 in defining pressure chambers 72 and 73 for actuating the switches 68 and 69 by movement transmitted through plungers 74 and 75 overlying these diaphragm members and which are slidable in the lower ends of the switch chambers. The chamber 72 is connected with the brake cylinder passage 31 through a connecting passage 76 and through the opening 47 of the plate member 34. The chamber 73 is connected directly with the bleed passage 57 by the short connecting passage 77.

The magnet housing 33 is provided with a depending stem 79 located substantially centrally of the magnet chamber 60 and having a reduced lower end portion 79a which engages the diaphragm sheet 64. The bleed passage 57 extends into the stem 79 from the lower end thereof and communicates with a valve chamber 82 which is also formed in this stem. The bleed valve 59 is located in the valve chamber 82 and comprises a seat member 83a (see Figs. 7 and 12) and a ball element 83b adapted to cooperate with such seat member for controlling a vent orifice 84 which extends through the seat member and constitutes a normally open vent for the bleed passage 57. Brake pipe fluid which is vented through the bleed passage 57 and the bleed valve orifice 84 escapes to atmosphere through a passage 80 and past a flexible insect guard 81.

Figure 8:
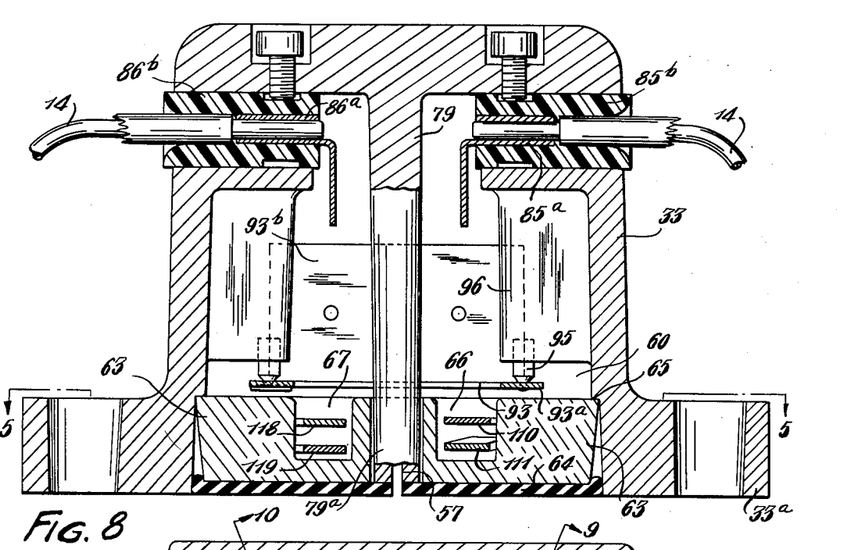
Fig. 8 is another partial vertical section taken through the adapter unit substantially as indicated by section line 8—8 of Figs. 6 and 7.
Figure 9:
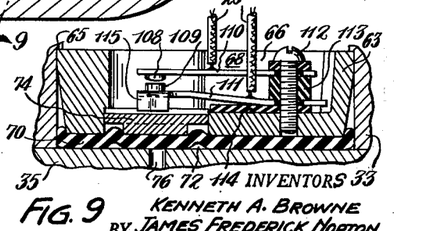
Figs. 9 and 10 are partial vertical sections taken through the switch devices of the adapter unit as indicated by section lines 9—9 and 10—10, respectively, of Fig. 5.
Figure 10:
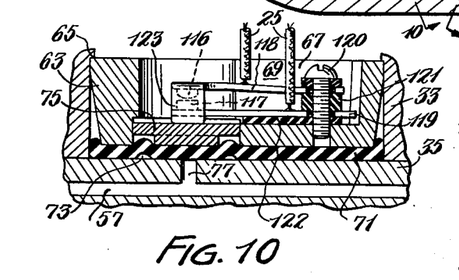

A pair of magnet coils 85 and 86 are disposed in the chamber 60 of the magnet housing 33 and have core members 87 and 88 extending in substantially parallel relation. These core members are magnetically connected adjacent the upper end thereof by a yoke 89. The magnet coils 85 and 86 have their windings connected in series relation such that, with the core members 87 and 88 and the yoke 89, they form a substantially horseshoe-shaped electromagnet having a pair of spaced magnet poles 90 and 91 at the lower end of the magnet chamber 60. The magnet coils 85 and 86 have one end thereof connected with terminal sleeves 85a and 86a, respectively, which are mounted in the housing 33 (see Fig. 8) by means of insulating bushings 85b and 86b. The terminal sleeves are adapted to have ends of the train wire 14 detachably inserted thereinto. On the cars 11, the magnet coils 85 and 86 are connected together at the opposite end thereof and are also connected with the ground conductor 25, as represented by the terminal point 25a in Fig. 18. On the caboose 17, the coils 85 and 86 are in a series relation between the train wire 14 and the ground conductor 26.

An armature 92 disposed immediately below the poles 90 and 91 is movable in response to energization of the magnet coils 85 and 86 and is mounted on an armature carrier which, in this instance, is a substantially L-shaped member 93. The armature 92 is mounted on the upper side of the horizontally disposed forked arm portion 93a of the carrier and the other arm 93b of the carrier extends in upright relation at the rear of the magnet coils and carries a counterweight 94. The armature carrier 93 is fulcrumed on a pair of pointed fulcrum pins 95 which are carried by, and project downwardly from, a pair of depending posts or brackets 96 of the magnet housing 33. The pointed lower ends of the fulcrum pins engage in depressions 97 provided in the armature carrier 93 and these depressions are retained in seating engagement with the pins by the upward pull of a tension spring 98 having the lower end thereof connected with the armature carrier 93 by means of the anchor pin 99. This spring has its upper end connected with the magnet housing 33 as by means of an anchor pin 100 having a threaded portion engaged by convolutions of the spring.

*The bleed valve of the valve and switch unit*

Reverting now to the bleed valve 59 it will be seen that the valve seat member 83a is a cup-shaped member having a recess 101 in the underside thereof in which the ball element 83b is located. The outer end of the bleed valve orifice 84 opens into the recess 101 such that the ball element 83b will restrict or close this orifice when the ball element is lifted upwardly so as to seat against the member 83a at such outer end of the orifice. When the ball element 83b is permitted to drop away from the outer end of the orifice 84, the restriction of the bleed passage 57 by the valve 59 is correspondingly decreased. The bleed valve orifice 84, as controlled by the ball element 83b, is a normally open vent orifice for the bleed passage 57.

Figure 7:
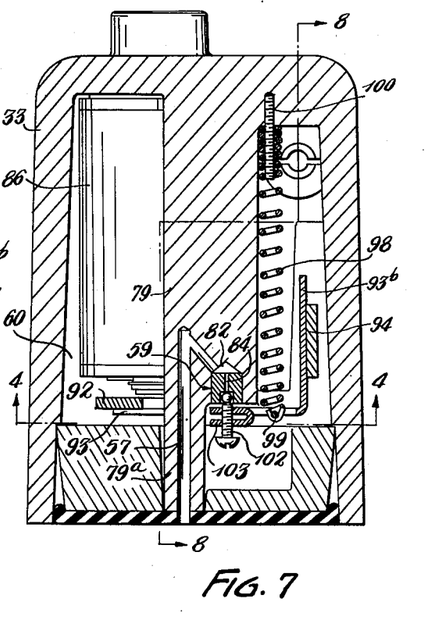

Actuating movement for the ball element 83b for controlling the bleed valve orifice 84 in this manner is provided by the armature carrier 93 in response to energization of the magnet coils 85 and 86. For this purpose the armature carrier 93 is provided with a screw 102 located in axial alignment with the orifice 84 and having its upper end disposed relative to the recess 101 such as to retain the ball element 83b in the latter. The screw 102 can be mounted in the armature carrier 93 by providing the latter with a reversely bent portion 103 in which the screw has threaded engagement as well as in the body portion of the armature carrier, as shown in Figs. 7 and 12.

The point of the armature carrier 93 at which the tension spring 98 is attached is located substantially on the same transverse axis as the fulcrum pins 95 and the location of this common axis with respect to the valve actuating screw 102 and the masses represented by the armature 92 and the counterweight 94 is such that the armature assembly will be balanced or nearly balanced and will be responsive to very small actuating forces applied to the armature. This balanced condition for the armature assembly is such that when the magnet coils 85 and 86 are deenergized or the energization of these coils is decreased, the ball element 83b of the bleed valve 59 will be moved away from the outer end of the bleed valve orifice 84 by the pressure of the fluid in the passage 57. On the other hand when the magnet coils 85 and 86 are energized, the armature 92 will be drawn upwardly toward or against the poles 90 and 91 depending upon the extent of ampere turn energization of these magnet coils and will cause a corresponding restricting or closing movement of the ball element 83b relative to the outer end of the orifice 84.

The magnet coils 85 and 86 of the cars 11 and of the caboose 17 are connected in series relation by the train wire 14 as shown in Fig. 18. This train wire comprises conductors 105 on the respective cars which have their ends connected to the metal coupler members 106 which are carried by the flexible hoses 107 of the brake pipe 13. When the cars 11 and the caboose 17 are connected into a train and the brake pipe hoses 107 are coupled together in the usual way by the coupler members 106, the conductors 105 of the respective cars will form the continuous train wire 14 and the magnet coils 85 and 86 of the individual cars will be connected in series circuit relation with each other and with the current control and car counting unit 15 of the locomotive by such train wire.

*The switches of the valve and switch unit*

As shown in Fig. 18, the ground conductors 25 of the cars 11 are connected with the train wire 14 at a point between the magnet coils 85 and 86. The switches 68 and 69 of the valve and switch unit 10 are located in series relation in this ground connection. The switch 68 is a normally open switch, that is to say, it is open at all times while the brakes of the car are in released condition. The switch 69 is a normally closed switch, that is to say, is in a closed position during the time that the brakes of the car are in the released condition.

As shown in Figs. 3, 5, 9 and 10, the switch 68 comprises a pair of upper and lower contacts 108 and 109 carried, respectively, by stationary and movable switch arms 110 and 111. These switch arms are mounted on the block 63 by the screw 112 but are insulated from the block and screw by insulating members 113 and 114. The lower switch arm 111 is a resilient arm having a stirrup portion 115 engaged by the plunger 74 such that upward movement of the plunger in response to a build-up of fluid pressure in the diaphragm chamber 72 will cause closing of the switch contacts 108 and 109.

The switch 69 comprises a pair of upper and lower contacts 116 and 117 carried, respectively, by a pair of upper and lower switch arms 118 and 119. The switch arms 118 and 119 are connected with the block 63 by means of a screw 120 but are insulated from the screw and block by the insulating members 121 and 122. The upper switch arm 118 is a resilient arm and has a stirrup or yoke portion 123 disposed in straddling relation to the lower contact 117 and engaged by the plunger 75 such that upward movement of the plunger in response to a build-up of fluid pressure in the diaphragm chamber 73 will deflect the arm 118 upwardly and cause opening movement of the switch contact 116.

With respect to the valve and switch unit 16 of the caboose 17, it should be explained that this unit is similar to the valve and switch unit 10 of the cars 11 in that it includes a bleed valve 59 controlled by an electromagnet which comprises magnet coils 85 and 86, and also includes a normally closed electric switch 124 located in the caboose ground connection 26. The switch 124 corresponds with the switch 68 of the car units 10 and is constructed and actuated in the same manner but is a normally closed switch instead of a normally open switch, and is opened to disable the ground connection 26 of the caboose by the same pressure fluid function as that which causes closing of the switches 68. It should also be explained with respect to the ground connection 26 that this conductor forms a direct connection between the rear end of the train wire 14 and the ground conductor 18, but its point of connection with the train wire is rearward of the magnet coil 86, as indicated at 26a, instead of between the magnet coils as is the case with the ground connections 25 of the cars 11.

*Pneumatic application of brakes*

With the construction and arrangement of the valve and switch units 10 and 16, as thus far described above, the brakes of the cars 11 and caboose 17 can be applied or released pneumatically in the regular way by the control functioning of the control valve mechanisms 19 in response to pressure variations in the brake pipe 13 initiated by manipulation of the engineer's brake valve 23. An application or release of the brakes thus produced can be conveniently referred to as a pneumatic application of a pneumatic release. The brakes of the cars 11 and the caboose 17 can also be applied or released under the control function of the valve and switch units 10 and 16 in response to manipulation of the current control device 24 of the locomotive 12, as is explained in greater detail hereinafter. An application or release of the brakes in response to such manipulation of the current control device 24 can be conveniently referred to as an electric application or an electric release.

*Electric application of brakes*

The electric application of the brakes is further explained in the detailed operation described hereinafter, but at this point a general description of an electric application will be given. Whenever energizing current is supplied from the locomotive 12 through the train wire 14 for producing an electric application, the current will traverse the coils 85 and 86 of the valve and switch unit 10 of each car and in energizing these coils will cause the bleed valve 59 to be actuated toward its closed position, thereby restricting or closing the bleed passage 57 and thus restricting or preventing the escape of brake pipe fluid through this bleed passage to atmosphere. Such restricting or closing of the bleed passage 57 will cause air pressure being supplied from the brake pipe 13 through the restricted orifice 38a to build up in the control chamber 51 and exert a downward pressure on the diaphragm member 53 and the thrust member 46 causing the valve 43 to be moved away from the seat 40. The opening of the valve 43 permits pressure from the reservoir passage 30 to be supplied through the connecting passage 42 to the brake cylinder passage 29 from which it passes to the brake cylinder 20 to cause an application of the brakes.

At the same time that the brake pipe pressure builds up in the control chamber 51 it also builds up in the control chamber 52 causing a downward movement of the diaphragm member 54 which shifts the valve 49 into engagement with the seat 50. The closing of the valve member 49 prevents the pressure being supplied to the brake cylinder through the brake cylinder passage 29 from flowing back to the control valve mechanism 19 through the passage 31.

The force with which the brakes of the cars will be applied will depend upon the extent to which the bleed passage 57 is restricted by the closing movement of the bleed valve 59. The force producing closing movement of the bleed valve 59 is, in turn, dependent upon or proportional to the extent of the ampere-turn energization of the magnet coils 85 and 86 and such energization of these coils depends upon the ampere value of the energizing current being supplied from the locomotive 12 through the train wire 14. The valves 43 and 49, as thus controlled by the bleed valve 59, the magnets 85, 86 and the train wire current, constitute a very sensitive relay valve means. Since the pressure fluid being supplied to the brake cylinder by the opening of the valve 43 also acts on the underside of the diaphragm member 53, it will oppose the pressure of the control chamber 51 such that the resulting brake cylinder pressure will be proportional to the train wire current. It will therefore be seen that by merely controlling the ampere value of the train wire current, the brakes can be applied with any desired force and can also be graduated on or off to any extent desired.

As pressure fluid is supplied to the brake cylinder 20 from the reservoir 22 during the electric application, the pressure builds up in the brake cylinder and in the lower control chamber 42 until it substantially balances the pressure in the control chamber 51 whereupon the spring 44 closes the valve 43. This closed position for the valve 43 is the lap condition for the control valve mechanism embodying the valve and switch unit 10.

In making an electric release of the brakes through the control function accomplished by the valve and switch units 10 and 16, the energizing current being supplied through the train wire 14 is interrupted to deenergize the magnet coils 85 and 86. Upon deenergization of these magnet coils the bleed valve 59 will open, as explained above under the heading relating to the bleed valve of the valve and switch unit, permitting the pressure in the control chambers 51 and 52 to escape to atmosphere. While the bleed valve remains open, the brake pipe fluid being supplied through the orifice 38a escapes freely to atmosphere through the bleed valve orifice 84 and will no longer cause a build-up of pressure in the control chambers 51 and 52. The release of pressure from the control chamber 52 permits brake cylinder pressure acting on the underside of the diaphragm member 54 to open the valve 49, thereby connecting the brake cylinder passage 29 within the passage 31 to permit the exhaust of brake cylinder pressure through the latter passage and through the exhaust means of the control valve mechanism 19.

Since the current supplied through the train wire 14 will produce an instantaneous energization or deenergization of the magnet coils 85 and 86 of all of the cars of the train, an electric application or an electric release will be produced for all of the brakes simultaneously. The escape of brake pipe fluid continuously through the normally open bleed passage 57 while the brakes are released will not waste any material amount of air because the bleed orifice 38a is of minute size. This bleed orifice is of such small size that, for normal charge conditions of the brake system, the leakage therethrough will not exceed 0.2 p. s. i. per minute.

The air brake apparatus of each car contains a substantial storage volume for air under pressure formed by the various reservoirs, chambers, pipes and passages which are charged with such air under pressure. The bleed orifice leakage of this permissible 0.2 p. s. i. for any given car represents a pressure drop and must be evaluated with respect to that car's own air storage volume and, on that basis, is so small as to be of negligible effect so far as the practical and successful operation of the air brake apparatus of that car is concerned, particularly under circumstances of air replenishment at a normal rate from the locomotive. Since the relation of bleed orifice leakage to air storage volume is this same 0.2 p. s. i. value (pressure drop) for each car, it is immaterial that the cars are coupled together with a continuous brake pipe connecting their respective air storage volumes. The permissible 0.2 p. s. i. leakage value is, therefore, not additive but represents the over-all bleed orifice leakage rate of pressure drop regardless of how many cars are in the train. It is assumed, of course, that the volume of fluid vented at each car does not exceed the capacity of the locomotive equipment to maintain normal brake pipe pressure against such accumulative leakage when the cars are coupled together in a train.

With respect to the size relationship between the bleed orifice 38a and the vent orifice 84, it should be explained that the cross-sectional area and flow capacity of the latter or vent orifice 84 is somewhat greater than the cross-sectional area and flow capacity of the former bleed or control orifice 38a. This size relationship permits the orifice 84 to vent air pressure from the chambers 51, 52 and 73 when the valve element 83b is released for opening movement, regardless of the fact that air pressure is being continuously delivered into the passage 57 through the orifice 38a.

A pneumatic application of the brakes initiated from the engineer's valve 23, as either a service application or an emergency application, can be made at any time without interference from the electrically controlled apparatus. When such a pneumatic application is made, air from the inshot and timing valves of the emergency portion 19c of the AB control valve mechanism 19 flows into the switch and valve unit 10 through passage 31 and then flows past the valve 49 and through the brake pipe passage 29 to the brake cylinder. During the pneumatic release of the brakes, the brake cylinder pressure is released from the brake cylinder by flowing through the passage 29 and the passage 42 from which it then flows through the passage 31 to the control valve mechanism 19 and is discharged to atmosphere through the exhaust opening of the latter.

*The current control unit*

The current control device 24 of the locomotive 12 will be described next. This control device is adapted to be manually actuated by the engineer for causing the above-explained electric application or electric release of the brakes to be made. The current control device 24 controls the ampere value of the energizing current which is supplied to the train wire 14 in making electric applications of the brakes and enables the engineer to vary this ampere value of the train wire current in accordance with the force with which he wishes the brakes to be applied or held.

Before proceeding with the detailed description of the current control device 24, it should be explained that a suitable current source is provided on the locomotive and can be in the form of a generator or storage battery, but is here represented merely as a pair of line conductors 128 and 129. The line conductor 129 is connected with the common ground 18 through the conductor 130 and the resistance device 131. The resistance device 131 is preferably in the form of a lamp having a low resistance when its filament is unheated and having a relatively high resistance when the filament is hot. This resistance device also serves as a signal lamp which will become lighted whenever a short-circuit of substantial current flow capacity occurs on the locomotive between the electrical apparatus of the control device 24 and ground, or whenever a short-circuit occurs involving the ungrounded side of the locomotive wiring.

The current control device

The current control device 24 comprises a housing 132 (see Fig. 13) having an axial chamber 133 therein in which is located a carbon pile resistor 134. The carbon pile is insulated from the wall of the housing 132 by a suitable insulating lining 135. The lower end of the carbon pile is solidly supported by a transverse wall 136 of the housing and the upper end of the pile is adapted to be subjected to a variable pressure by means of an electrically conducting pressure plate 137. Variable pressure is adapted to be applied to the upper end of the carbon pile by lateral swinging of a control handle 138 and by the action of a rotary cam member 139 which is adapted to be rotated by such swinging of the handle.

The rotary cam member 139 is in the form of a sleeve which is supported in the upper portion of the housing 132 for rotation about the axis of the carbon pile 134. The upper end of this cam member is connected with the inner end of the handle 138 by means of a transverse pin 140. The lower portion of the cam member 139 has an axial passage 141 therein forming a guideway in which a plunger 142 is slidable. A spring 143 disposed between the plunger 142 and the pressure plate 137 transmits pressure to the carbon pile according to the extent to which the spring has been loaded by downward axial movement of the plunger.

For imparting such downward axial movement to the plunger 142 the cam member 132 is provided with a pair of helical cam slots 144 in the side wall thereof (see Fig. 14) which cooperate with a cam follower in the form of a transverse pin 145 which extends through these cam slots and engages the upper end of the plunger 142. The ends of the pin 145 extend into a pair of opposed vertical slots 146 of the housing 132. These slots hold the pin 145 against revolving in the housing with the cam member 139 but permit the pin to be shifted axially in the housing by the cam slots 144 in response to rotation of the cam member. This axial shifting of the pin 145 in the slots 146 forces the plunger 142 downwardly to load the spring 143. The extent to which the spring 143 is loaded in this manner will correspond with the angular amount of lateral swinging which has been imparted to the control handle 138 by the engineer.

The train wire switch

A switch device 148 mounted on the housing 132 of the current control device 24 and controlling the train wire circuit (see Figs. 13, 15 and 18) can be conveniently described at this point. The switch device 148 comprises a housing or shell 149, which is mounted on the housing 132 in substantially opposed relation to the inner end of the handle 138, and a pair of switch contacts 150 and 151 contained in such shell. This pair of contacts constitute a switch 152 which is open when the handle 138 is in an off position, that is to say in a position corresponding with the released condition of the brakes of the train and is adapted to be closed by the initial swinging movement of the handle in the direction to cause an electric application of the brakes.

The contact 150 of the switch 152 is a substantially stationary contact carried by the switch arm 156. The contact 151 is a movable contact and is carried by a flexible switch arm 158. The switch arms 156 and 158 are supported in the housing 149 by means of suitable insulating blocks 159 disposed between these arms and between the arm 156 and the housing 132. A fastening screw 160 extending through the insulating blocks and the switch arms and insulated from the latter secures the switch assembly 152 to the housing 132.

To render the switch 152 responsive to the swinging of the handle 138 for causing the above mentioned actuation of this switch, a plunger 161 made of insulating material is mounted in a radial opening 162 of the housing 132 and has a stem portion 161a extending into the switch housing 149 and engaging the switch arm 158. The plunger 161 is provided at its inner end with a head 161b which engages a rounded cam surface 163 formed on the inner end of the handle 138. A compression spring 164 disposed in the opening 162 and engaging the head 161b holds the latter against the cam surface 163.

The contour of the cam portion 163 is such that swinging of the handle 138 away from its off position and in the direction to produce an electric application of the brakes of the train permits the plunger 161 to be moved inwardly by the spring 164 thereby releasing the switch arm 158 to cause closing of the switch 152. When the handle 138 is swung in the opposite direction to its off position, the cam surface 163 causes an outward movement of the plunger 161 which deflects the switch arm 158 toward the right to thereby open the switch 152.

The same swinging movement of the handle 138 away from its off position and in the direction to cause an electric application of the brakes of the train also causes rotation of the cam member 139 in a direction to produce a downward movement of the plunger 142 by the pin 145 thereby compressing the spring 143 and loading the carbon pile 134 to decrease its resistance.

Figures 13, 14, 15, 16:
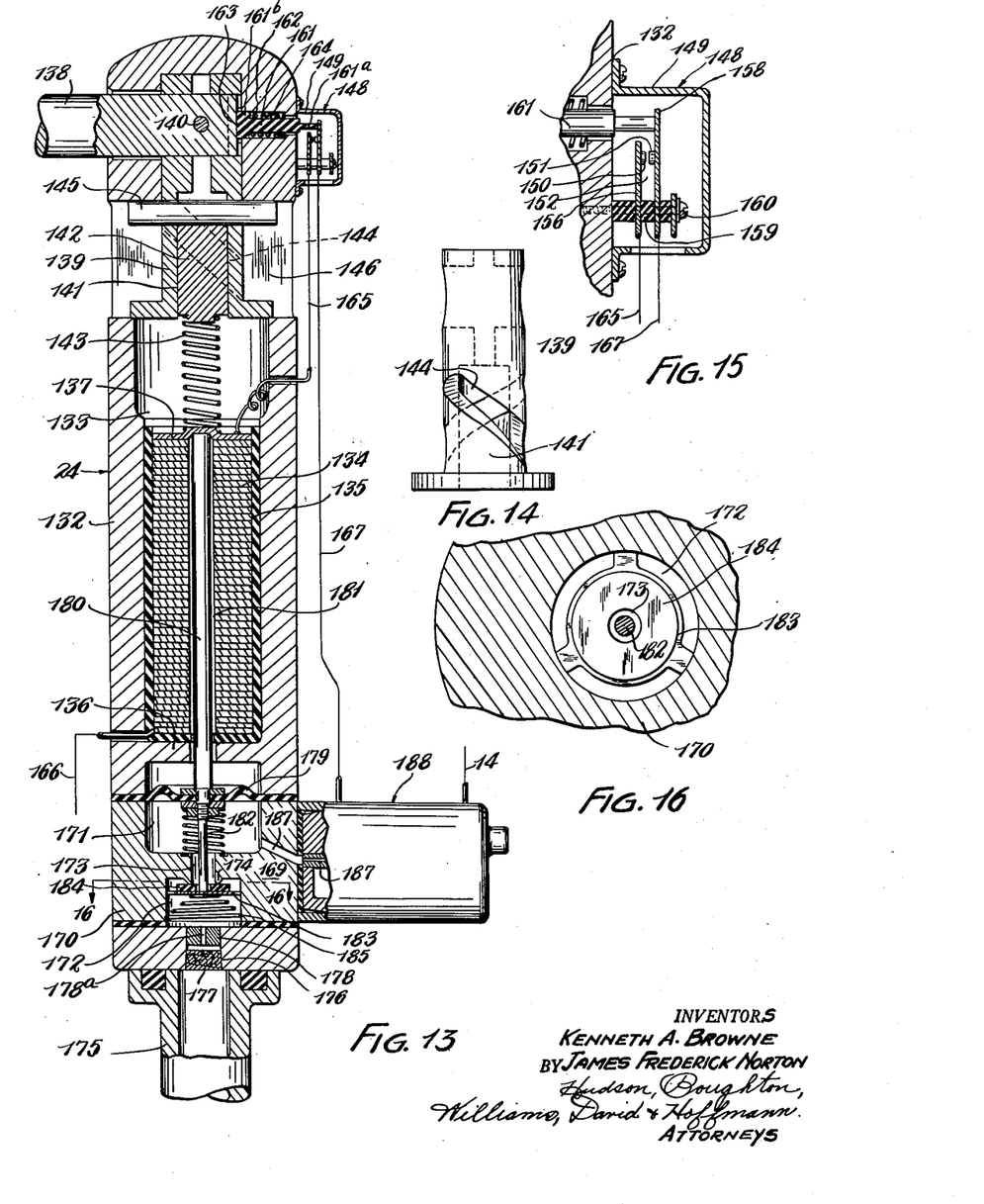
Fig. 13 is a vertical section taken through the current control device of the locomotive and showing such current control device in detached relation.
Fig. 14 is an elevation of a cam member of the current control device of Fig. 13 and showing such cam member in detached relation.
Fig. 15 is a fragmentary vertical section taken through switch means located at the upper end of the current control device of Fig. 13 and showing such switch means on a larger scale.
Fig. 16 is a transverse sectional detail taken through the lower portion of the current control device as indicated by section line 16—16 of Fig. 13.

As shown in Figs. 13 and 18, the upper end of the carbon pile is electrically connected with the contact 150 of the switch 152 by a conductor 165. The lower end of the carbon pile is connected with the line conductor 128 by the conductor 166. The contact 151 of the switch 152 is connected with the train wire 14 by circuit means which includes a conductor 167 connected with the intermediate switch arm 158 such that the variation in the resistance of the carbon pile 134, as above explained, will control the ampere value of the current being supplied to the train wire.

Action of brake pipe fluid on current control device

To permit the carbon pile 134 to be accurately adjusted to the current value desired to be transmitted through the train wire 14 such that the same amount of actuation of the control handle 138 will always result in the same current value being supplied to the train wire regardless of the length of the train or the resistance of the train wire circuit, the current control device 24 is provided at the lower end thereof with valve mechanism 169 by which pressure fluid is supplied from the brake pipe 13 and is made to counteract and balance the compressive load being applied to the carbon pile by the spring 143. The valve mechanism 169 includes a housing section 170 mounted on the lower end of the housing 132 and containing a diaphragm chamber 171 and a valve chamber 172. A passage 173 extending axially of the housing section 170 connects the diaphragm chamber 171 with the valve chamber 172 and is surrounded at its lower end by a valve seat 174. The mechanism 169 also includes a conduit 175 which is connected with the brake pipe 13 and supplies pressure fluid from the latter to the valve chamber 172 through a passage 176. This passage is provided with a strainer 177 and an orifice plug 178 having a restricted orifice 178a therein.

A diaphragm 179 extending across the diaphragm chamber 171 is connected with a shouldered lower portion of a push rod 180 which extends axially through an opening 181 of the carbon pile 134. The upper end of the push rod 180 engages the underside of the pressure plate 137 to receive motion from the latter. At its lower end the push rod 180 is provided with a reduced extension 182 which is in engagement with a valve plate 183. A valve member 184 carried by the plate 183 is normally held in engagement with the valve seat 174 by a compression spring 185 disposed in the valve chamber 172 and acting on the valve plate.

When the handle 138 of the current control device 24 is swung in a direction to produce an electric application of the train brakes it causes loading of the carbon pile 134, as explained above. The initial downward movement of the pressure plate 137 which causes such loading of the carbon pile is transmitted downwardly by the push rod 180 to unseat the valve 184. This permits brake pipe fluid to flow from the conduit 175 through the restricted orifice 178a into the valve chamber 172 and then through the passage 173 into the diaphragm chamber 171.

*The electromagnetic bleed valve of the current control device*

To control the effect on the diaphragm 179 of the brake pipe fluid thus supplied to the diaphragm chamber 171, this chamber is provided with a bleed passage or vent 187 which is controlled by a bleed valve device 188 of the solenoid type. While the bleed passage 187 remains open, the brake pipe fluid will be vented to atmosphere and no appreciable pressure value will be built up in the diaphragm chamber 171. When the bleed passage 187 is restricted or closed, pressure will build up in the chamber 171 to an extent corresponding with the restriction imposed on the bleed passage and such pressure acting on the diaphragm 179 will oppose the loading force being applied to the upper end of the carbon pile 134. In order that the opposing force thus exerted by the diaphragm 179 be in accordance with a definite function of the train wire current, the solenoid bleed valve device 188 is arranged to be energized by train wire current such that the pressure of brake pipe fluid effective in the diaphragm chamber 171 will be dependent upon the ampere value of the current actually being supplied to the train wire.

Figure 17:
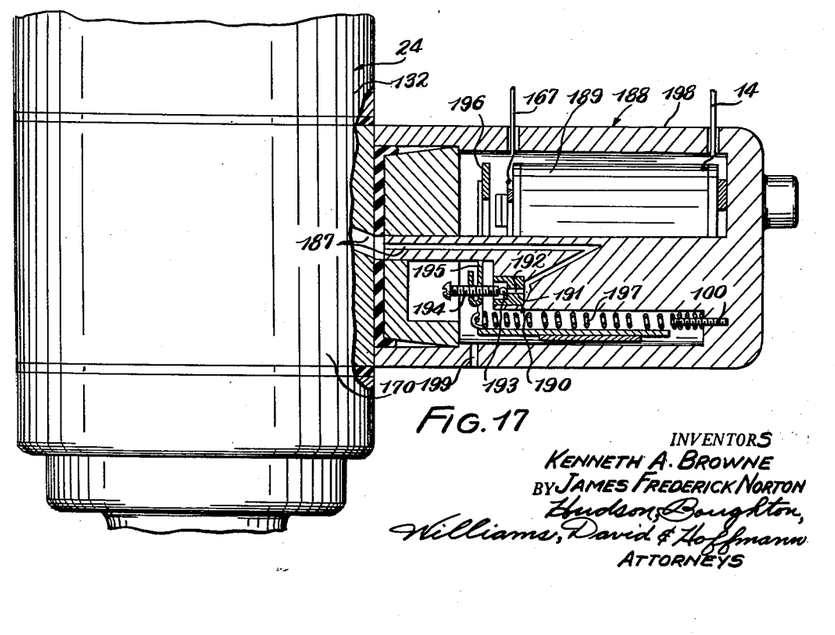
Fig. 17 is a fragmentary vertical section taken through electromagnetic bleed valve means located at the lower end of the current control device of Fig. 13 and showing such electromagnetic bleed valve means on a larger scale.

As shown in Fig. 17, the solenoid bleed valve device 188 accordingly comprises a pair of magnet coils 189 connected in series relation in the train wire circuit and a bleed valve 190 which is responsive to the energization of the magnet. The bleed valve 190 is of a construction similar to that of the above-described bleed valve 59 of the valve and switch units 10 and 16 and comprises an orifice plug 191 having a vent orifice 192 therein and also forming a seat for a ball valve element 193. The ball element 193 controls the orifice passage 192 by closing the same, or varying the restriction thereof, and is adapted to be moved toward its closed position by a screw 194 extending through an armature carrier 195. An armature 196 mounted on the carrier 195 is movable relative to the magnet coils 189 in response to variations in the energization thereof by the train wire current. A tension spring 197 corresponding with the spring 98 of the bleed valve 59 acts on the armature carrier 195 to hold the latter in a substantially balanced condition such that when the magnet coils 189 are deenergized the pressure of the fluid in the passage 187 will move the ball element 193 toward its open position.

The magnet coils 189 and the bleed valve 190 are contained in a suitable housing 198 which is connected with the housing section 170 such that the bleed passage 187 extending into the housing 198 connects the diaphragm chamber 171 with the atmosphere through the normally open orifice passage 192 of the bleed valve. The fluid vented from the diaphragm chamber 171 through the bleed valve 190 is permitted to escape from the housing 198 through the vent passage 199. When the energization of the magnet coils 189 by the current being supplied to the train wire 14 moves the armature 196 to cause restriction or closing of the bleed orifice 192, the brake pipe fluid being supplied to the diaphragm chamber through the orifice 178a and the passage 173 will cause pressure to build up in the diaphragm chamber and oppose the loading force being applied to the upper end of the carbon pile 134. The pressure will continue to build up in the diaphragm chamber 171 until it is sufficient to cause opening of the ball element 193 of the bleed valve device 190 against the pull of the magnet coils 189 or, in other words, until this pressure is proportional to the current value of the train wire current.

*Operation in making an electric application of the train brakes*

The operation of the improved air brake apparatus of this invention will now be described in greater detail and such detailed operation will first be given for an electric application of the brakes of the train. In making an electric application of the brakes, the engineer swings the lever 138 of the current control device 24 from its off position and toward its applied position for a distance corresponding with the force of the brake application desired to be made. At the time that such an electric application of the brakes is made the pneumatic control valve mechanisms 19 will be in the position corresponding with the released condition of the brakes. The initial swinging movement of the handle 138 toward the applied position actuates the train wire switch device 148 during which the cam portion 163 of the handle permits the plunger 161 to be shifted by the spring 164, thereby causing opening of the switch 155 and closing of the switch 152.

The closing of the switch 152 connects the train wire 14 with the supply line conductor 128 through magnet coils 189 of the bleed valve device 188, through the carbon pile 134 and the conductor 166. The on position to which the handle 138 is moved will cause compression of the spring 143 of the current control device 24 for loading the carbon pile 134, thus decreasing the resistance of the carbon pile to a value which will permit current of a desired ampere value to be supplied to the train wire 14.

The loading of the carbon pile 134 by the spring 143 will be balanced by the pressure of the brake pipe fluid which is supplied to the diaphragm chamber 171 through the passage 173 in response to the opening of the valve 184 by the push rod 180. The pressure of brake pipe fluid which builds up in the diaphragm chamber 171 is in accordance with the extent to which the normally open bleed passage 187 is restricted by the bleed valve 190 of the electromagnetic bleed valve device 188, as previously explained herein.

The actuation of the handle 138 to the position for producing a desired electric application of the brakes causes an initial over-compression of the carbon pile 134 which is relieved by the opposing force of the rod 180 as soon as fluid pressure builds up in the diaphragm chamber 171. This initial over-compression of the carbon pile is a desirable feature because it permits an initial train wire current of a somewhat excessive value to be supplied to the train wire 14 and this will insure an initial strong energization of the magnet coils 85 and 86 to pull in the armatures 92 and bring about a prompt electric application of the brakes.

The energizing current which is thus supplied to the train wire 14 by the current control device 24 passes through the coil 255 of the relay 254 causing the switch 257 to be closed, thereby lighting the pilot light 259. The train wire current also passes through the coils 85 and 86 of the valve and switch units 10 and 16 of the cars 11 and the caboose 17. At the caboose this energizing current flows to the common ground conductor 18 through the normally closed switch 124 and the ground connection 26. The train wire circuit is completed from the ground 18 to the supply line conductor 129 through the conductor 130 and the lamp 131.

The train wire current energizes the magnet coils 85 and 86 of the valve and switch units 10 and 16 causing the bleed valves 59 of these units to be restricted or closed by movement of the ball element 83b toward the seat element 83a. The restriction of the bleed orifices 84 of the valve and switch units 10 and 16 in this manner causes the pressure of the brake pipe fluid being supplied through the orifice passages 38a to build up in the control chambers 51 and 52 to cause opening of the valve 43 and closing of the valve 49. As already explained above, the opening of the valve 43 permits pressure fluid to be supplied from the emergency reservoir 22 to the brake cylinder 20 through the passages 30 and 29 to cause an application of the brakes. At the completion of the electric application, the brake cylinder pressure in the passage 42 will have built up to substantially the value of the control pressure in the chamber 51 whereupon the valve 43 is closed by the spring 44. This closed position for the valves 43 and 49 is the lap condition of the apparatus during which the brakes will be maintained in their applied position.

The closing of the valve 49 prevents the pressure which is being supplied from the emergency reservoir 22 from flowing back into the control valve mechanism 19 through the passage 31. The force with which the brakes are applied will depend upon the ampere value of the energizing current supplied to the magnet coils 85 and 86, as previously explained herein, and after an electric application of the brake has thus been made the brakes can be graduated on or off a desired amount by varying the ampere value of the energizing current being supplied to the magnet coils 85 and 86 through the train wire 14.

In causing the previously applied brakes to be graduated on, the increase in the energizing current for the magnet coils 85 and 86 produces a further closing force on bleed valve 59 which, in turn, causes an increase in the pressure of the control chambers 51 and 52. The increased pressure in the control chamber 51 now exceeds the brake cylinder pressure existing in the passage 42 and a resulting downward movement of the diaphragm 53 will open the valve 43 and cause the brake cylinder pressure to be increased. When the brake cylinder pressure increases to substantially the value of the pressure in the control chamber 51, the valve 43 is again closed by the spring 44.

In causing the previously applied brakes to be graduated off, the decrease in the energizing current for the magnet coils 85 and 86 produces a decreased closing force on the bleed valve 59 which, in turn, causes a decrease in the pressure of the control chambers 51 and 52. The decreased pressure of the control chamber 52 permits the valve 49 to be opened slightly by the relatively higher brake cylinder pressure in the passage 42 to allow some of the brake cylinder fluid to escape through the passage 31. When the brake cylinder pressure decreases to substantially the pressure in the control chamber 52, the valve 49 is reclosed to maintain the brake cylinder fluid at such desired lower pressure. The valve 49 will be reclosed under these circumstances because of the greater area of the diaphragm 54 upon which the control pressure acts in relation to the area on which the brake cylinder pressure is acting.

Whenever an electric application of the brakes is made, that is to say, whenever energizing current is supplied to the magnet coils 85 and 86 through the train wire 14, the pressure of brake pipe fluid which builds up in the bleed passage 57 by reason of the restricting or closing of the bleed valve 59, causes pressure to also build up in the diaphragm chamber 73 and shift the plunger 75 upwardly to cause opening of the normally closed electric switch 69. It should also be explained at this point that whenever a pneumatic application of the brakes is made by manipulation of the engineer's brake valve 23, some of the pressure fluid which is then supplied to the brake cylinder 20 by the control valve mechanism 19 flows through the passage 31 and into the control chamber 72 through the passage 76. The pressure thus supplied to the control chamber 72 causes the plunger 74 to be moved upwardly to close the normally open switch 68. The pressure which is supplied in this same manner to the control chamber 72 of the valve and switch unit 16 of the caboose 17 causes opening of the normally closed switch 124 which is located in the ground connection 26.

The switches 68 and 69 form no part of the invention being claimed herein.

In releasing the brakes of the train after such an electric application thereof, the handle 138 of the current control device 24 is moved to its off position, thereby opening the switch 152 of the train wire switch device 148 and thus deenergizing the magnet coils 85 and 86 of the valve and switch units 10 and 16. The deenergization of the train wire circuit causes the deenergization of the relay 254 which permits the spring 258 to open the switch 257 and extinguish the pilot light 259. The deenergization of the magnet coils 85 and 86 permits opening of the bleed valves 59 of the units 10 and 16, thereby allowing the pressure in the control chambers 51 and 52 and in the control chamber 73 to be vented to atmosphere through the bleed valve orifice 84.

The release of pressure from the control chamber 52 permits reopening of the valve 49 by the action of brake cylinder pressure against the underside of the diaphragm member 54, thereby connecting the brake cylinder passage 29 with the inshot and timing valve apparatus of the control valve mechanism 19 through the passage 31 to permit venting of brake cylinder pressure to atmosphere through the appropriate valves and passages of this control valve mechanism which has remained in its release position throughout the electric application. The release of pressure from the control chamber 73 permits reclosing of the normally closed switch 69.

*Control of electric application of brakes from caboose*

The train wire circuit can be controlled by a switch 282 of the caboose 17 for the purpose of initiating an electric application of the brakes of the train. By moving the switch member 282 into engagement with a contact 283 the train wire circuit will be supplied with energizing current from a battery 284 carried by the caboose and the ampere value of the energizing current then being supplied to the train wire circuit can be varied by a rheostat member 285. By thus moving the switch member 282a into engagement with the contact 283, the brakes of the train will be electrically applied by energization of the train wire circuit from the battery 284 and the force with which the brakes are applied can be varied by varying the ampere value of the energizing current by appropriate adjustment of the rheostat member 285. The brakes of the train can also be electrically released from the caboose by moving the switch member 282a out of engagement with the contact 283 to thereby deenergize the train wire circuit. Whenever the brakes of the train are being applied by manipulation of the control switch 282 of the caboose, the pilot lamp 259 will be lighted in the locomotive.

When the caboose 17 occupies a position at the rear end of the train the switch member 282a normally remains in engagement with a contact 287 of the ground connection 26 to permit control of the brakes from the locomotive in the manner already explained above. At this time the battery 284 is disconnected from the system at the point of the switch contact 283. The switch 282 also includes a dead contact 288 for use whenever the caboose is located at some intermediate point in the train. When the caboose is at such an intermediate point, the switch member 282a is shifted into engagement with the dead contact 288 such that the ground connection 26 will remain permanently open. The open ground connection 26 of the caboose 17 also permits an electric application of the brakes to be made on cars located to the rear of the caboose.

*Conclusion*

From the accompanying drawings and the foregoing detailed description it will now be readily understood that this invention provides improved air brake apparatus in the form of an adapter device for application to control valve mechanisms of the AB type such that the application of the brakes of the train can be controlled, either electrically or pneumatically. It will now also be understood that this invention also provides novel air brake control valve means of such an adapter type in which a normally open bleed passage is employed for controlling the fluid pressure actuation of a relay valve means which, in turn, controls the supply of pressure fluid to the brake cylinders and the exhaust of fluid therefrom.

Additionally, it will be seen that this invention provides for the use of solenoid valve means as a part of such an adapter device for controlling the flow capacity of the normally open bleed passage such that the application and release of the brakes can be electrically controlled from the control vehicle or locomotive.

The improved air brake apparatus of this invention also results in the attainment of numerous important advantages including those hereinafter briefly stated.

The improved apparatus results in better slack control because when an electric application is called for it produces a substantially simultaneous application of the brakes on all of the cars, such that there will be no tendency for a run-in of slack except that caused by the weight differential of the various cars.

When the brakes are electrically released, the brakes of all of the cars will be released substantially simultaneously, thereby minimizing the run-out of slack such that the brakes can be safely released while the train is moving at any speed.

Since the braking pressure developed during an electric application of the brakes is proportional to the ampere value of the current supplied to the train wire circuit, the braking pressure can be accurately determined and the brakes can be graduated off or on as may be desired.

This improved air brake apparatus eliminates the effect known as "dynamiting" because when brake applications are made electrically, both the service and emergency pistons of the AB control valve mechanism remain in charging position and this positively eliminates the possibility of an undesired emergency occurring during the electric operation of the brakes.

The present invention eliminates the need for retaining valves because the service and emergency pistons of the AB control valve mechanism remain in charging position at all times during braking under electric control and the air which is used in applying the brakes under such electric control is continuously being replaced through the charging ports. The brakes can therefore be repeatedly applied and released without reducing the supply of air in the service and emergency reservoirs.

The improved apparatus also results in more uniform braking because the electrically controlled relay valve means develops equal brake cylinder pressure on all cars regardless of brake cylinder piston travel or brake cylinder leakage.

Greater safety is afforded by this improved air brake apparatus because the reservoirs are maintained fully charged at all times such that full braking power from either an electric or a pneumatic application is always available and if an electric application does not develop promptly after being called for, a pneumatic application of the brakes can still be made.

The improved apparatus also provides for the application of the train brakes under electric control exercised from the caboose with an instantaneous signal of such rear end application being given on the locomotive.

Having thus described our invention, we claim:

1. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection adapted to be continuously supplied with control fluid under pressure from said brake pipe, an emergency reservoir connection, a brake cylinder connection and a common supply and exhaust connection; said housing member having a first connecting passage for connecting said brake cylinder connection with said emergency reservoir connection and a second connecting passage for connecting said brake cylinder connection with said common supply and exhaust connection; fluid pressure actuatable valve means in said housing member for controlling said first and second connecting passages and including a control chamber in open communication with said control fluid connection; means restricting the communication of said control fluid connection with said control chamber; means defining a normally open restricted atmosphere connection providing communication between said control chamber and atmosphere such that the fluid pressure in said control chamber is normally insufficient to cause actuation of said valve means; and other valve means controlling fluid flow through said atmosphere connection so as to cause actuating pressure to build up in said control chamber.

2. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof in communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection, an emergency reservoir connection, a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member and adapted to cause actuation of said valve means; means for supplying control fluid under pressure to said responsive means; and means for varying the effectiveness of said control fluid on said responsive means comprising a normally open bleed passage and bleed valve means controlling said bleed passage.

3. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection; an emergency reservoir connection; a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member for causing actuation of said valve means and including expansible chamber means; means for continuously supplying pressure fluid to said expansible chamber means; means defining a normally open restricted bleed passage leading from said expansible chamber means for exhausting fluid therefrom; and other valve means controlling fluid flow through said bleed passage so as to cause actuating pressure to build up in said expansible chamber means.

4. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection; an emergency reservoir connection; a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member for causing actuation of said valve means and including expansible chamber means having a control chamber means and fluid pressure differential responsive means movable in said control chamber means; means for continuously supplying control fluid under pressure to said control chamber means; the movable means of said expansible chamber means being subject on one side thereof to the pressure of said brake cylinder connection and on the other side thereof to the pressure of said control chamber means; means defining a normally open restricted bleed passage leading from said control chamber means for exhausting fluid therefrom such that the control fluid pressure in said control chamber means is normally insufficient to cause actuation of the first-mentioned valve means; and electromagnetic valve means controlling said bleed passage and adapted to be energized so as to cause control fluid pressure to build up in said control chamber means sufficient to produce actuation of said first-mentioned valve means.

5. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection, an emergency reservoir connection, a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member and adapted to cause actuation of said valve means; means for supplying control fluid under pressure to said responsive means; means for varying the effectiveness of said control fluid on said responsive means comprising a normally open bleed passage and bleed valve means controlling said bleed passage; solenoid means for causing actuation of said bleed valve means; and circuit means for energizing said solenoid means.

6. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof in communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a brake pipe connection, and emergency reservoir connection, a brake cylinder connection and a common supply and exhaust connection; valve devices in said housing member comprising a normally closed first valve device controlling communication between said brake cylinder connection and said emergency reservoir connection, and a normally open second valve device controlling communication between said brake cylinder connection and said common supply and exhaust connection; fluid pressure responsive means operable to cause opening of said first valve device and closing of said second valve device; a flow restricting means; means for supplying brake pipe fluid under pressure to said responsive means past said restricting means; and means for varying the effectiveness of said brake pipe fluid on said responsive means comprising a normally open bleed passage to atmosphere and bleed valve means controlling said bleed passage.

7. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof in communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a brake pipe connection, and emergency reservoir connection, a brake cylinder connection and a common supply and exhaust connection; a normally closed first valve device in said housing member controlling communication between said brake cylinder connection and said emergency reservoir connection; a normally open second valve device in said housing member controlling communication between said brake cylinder connection and said common supply and exhaust connection; a first control chamber in said housing member; a first fluid pressure differential responsive means operable to cause opening of said first valve device and being subject on one side thereof to the pressure of said brake cylinder connection and on the other side to the pressure of said first control chamber; a second control chamber in said housing member; a second fluid pressure differential responsive means operable to cause actuation of said second valve device and being subject on one side thereof to the pressure of said brake cylinder connection and on the other side to the pressure of said second control chamber; restricted passage means for continuously supplying brake pipe fluid under pressure to said control chambers such that the fluid pressure in said control chambers is normally insufficient to cause actuation of said first and second valve devices; means defining a normally open atmosphere connection providing communication between said control chambers and atmosphere; and valve means operable to substantially close said atmosphere connection to cause actuating pressure from said brake pipe to build up in said control chambers.

8. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection, an emergency reservoir connection, a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member and adapted to cause actuation of said valve means; means for supplying control fluid under pressure to said responsive means; means for varying the effectiveness of said control fluid on said responsive means comprising a normally open bleed passage and bleed valve means controlling said bleed passage; solenoid means for causing actuation of said bleed valve means; a variable resistance device adapted to be mounted on a control vehicle; manually operable actuating means effective on said resistance device for varying the resistance value thereof; other actuating means effective on said resistance device in opposition to said manually operable means for producing a resultant setting of said resistance device; and energizing circuit means for connecting said solenoid means with said resistance device including a train wire and adapted to supply energizing current to said solenoid means of an ampere value corresponding with the resultant setting of said resistance device.

9. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof for communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a control fluid connection, an emergency reservoir connection, a brake cylinder connection and a common supply and exhaust connection; valve means in said housing member controlling communication between said brake cylinder connection and said emergency reservoir connection, and between said brake cylinder connection and said common supply and exhaust connection; fluid pressure responsive means in said housing member and adapted to cause actuation of said valve means; means for supplying control fluid under pressure to said responsive means; means for varying the effectiveness of said control fluid on said responsive means comprising a normally-open first bleed passage and first solenoid bleed valve means controlling the flow capacity of said first bleed passage in accordance with the ampere-turn energization of the solenoid of said first solenoid bleed valve means; a variable resistance device adapted to be mounted on a control vehicle; manually operable actuating means effective on said resistance device for varying the resistance value thereof; a second fluid pressure responsive means of the expansible pressure chamber type and effective on said resistance device in opposition to said manually operable means and adapted to produce a resultant setting of said resistance device; means for supplying pressure fluid to the chamber of the last-mentioned responsive means; means defining a normally-open second bleed passage leading from the chamber of said last mentioned responsive means for exhausting fluid therefrom; a second solenoid bleed valve means controlling the flow capacity of said second bleed passage in accordance with the ampere-turn energization of the solenoid of said second solenoid bleed valve means; and means connecting the solenoids of said first and second solenoid bleed valve means in circuit with said resistance device for energization at an ampere value corresponding with the resultant setting of said resistance device.

10. An adapter for use with an AB-type control valve mechanism and its associated pipe bracket, brake pipe, emergency reservoir and brake cylinder; comprising connected plate and housing members of which the plate member is adapted to be clamped in interposed relation between said pipe bracket and the emergency section of the AB mechanism in blocking relation to the common supply and exhaust brake cylinder passage of said mechanism; said plate member having ports on opposite sides thereof in communication respectively with the blocked ends of said brake cylinder passage and also having first through openings therein for communication respectively with said brake pipe and emergency reservoir through passages of said pipe bracket; said plate member having other through openings therein for maintaining the continuity of other passages of said AB mechanism comprising the main charging passage, the quick action reservoir passage, and the passages to the inshot and timing valve mechanisms; said plate member also having passages therein extending to said housing member from said ports and said first through openings and comprising a brake pipe connection, an emergency reservoir connection, a brake cylinder connection and a common supply and exhaust connection; valve devices in said housing member comprising a normally closed first valve device controlling communication between said brake cylinder connection and said emergency reservoir connection, and a normally open second valve device of the solenoid type controlling communication between said brake cylinder connection and said common supply and exhaust connection; fluid pressure responsive means operable to cause opening of said first valve device and closing of said second valve device; and means for supplying brake pipe fluid under pressure to said responsive means to actuate the same.

References Cited in the file of this patent
UNITED STATES PATENTS

| | | |
|---|---|---|
| 937,393 | Turner et al. | Oct. 19, 1909 |
| 1,514,999 | Thomas | Nov. 11, 1924 |
| 1,653,131 | Thomas | Dec. 20, 1927 |
| 1,682,308 | Schaede | Aug. 28, 1928 |
| 1,763,120 | Aspinwall | June 10, 1930 |
| 1,776,300 | Thomas | Sept. 23, 1930 |
| 1,869,791 | Wright | Aug. 2, 1932 |
| 2,011,237 | Baughman | Aug. 13, 1935 |
| 2,050,430 | Erickson | Aug. 11, 1936 |
| 2,065,194 | Baughman | Dec. 22, 1936 |
| 2,092,014 | Pardee | Sept. 7, 1937 |
| 2,159,610 | West | May 23, 1939 |
| 2,159,797 | Hewitt | May 23, 1939 |
| 2,165,999 | Farmer | July 11, 1939 |
| 2,173,940 | Hewitt et al. | Sept. 26, 1939 |
| 2,187,114 | Ellwood | Jan. 16, 1940 |
| 2,310,298 | Kuhl et al. | Feb. 9, 1943 |
| 2,336,887 | Piron | Dec. 14, 1943 |
| 2,464,978 | Hines | Mar. 22, 1949 |

OTHER REFERENCES

The Type AB Freight Car Brake Equipment Instruction Pamphlet No. 32, February 1933, New York Air Brake Company, Watertown, New York, page 64.